United States Patent [19]
Bruce et al.

[11] Patent Number: 5,119,460
[45] Date of Patent: Jun. 2, 1992

[54] ERBIUM-DOPED PLANAR OPTICAL DEVICE

[75] Inventors: Allan J. Bruce, Westfield; Joseph Shmulovich, Murray Hill; Amy Wong, Whitestone; Yiu-Huen Wong, Summit, all of N.J.

[73] Assignee: AT&T Bell Laboratories, Murray Hill, N.J.

[21] Appl. No.: 691,262

[22] Filed: Apr. 25, 1991

[51] Int. Cl.$^5$ ............................ G02B 6/16; H01S 3/30
[52] U.S. Cl. ................................... 385/142; 385/141; 372/6
[58] Field of Search .............. 350/96.34, 96.3, 96.31, 350/96.32, 96.33; 372/6

[56] References Cited

U.S. PATENT DOCUMENTS

| | | | |
|---|---|---|---|
| 4,425,246 | 1/1984 | Izawa et al. | 65/18.2 |
| 4,586,785 | 5/1986 | Swinehart | 350/96.34 X |
| 4,826,288 | 5/1989 | Mansfield et al. | 350/320 |
| 4,926,995 | 10/1990 | Andrew et al. | 350/96.34 |
| 5,005,175 | 4/1991 | Desurvire et al. | 350/96.34 |
| 5,027,079 | 6/1991 | Desurvire et al. | 350/96.34 X |

OTHER PUBLICATIONS

*Electronics Letters*, vol. 27, No. 4, Feb. 14, 1991, "Guided-Wave Laser Based on Erbium-Doped Silica Planar Lightwave Circuit," by T. Kitagawa et al., pp. 334-335.

Primary Examiner—John D. Lee
Assistant Examiner—Phan T. Heartney
Attorney, Agent, or Firm—Martin I. Finston; Eugen E. Pacher

[57] ABSTRACT

An active optical device comprises a glass, waveguiding structure disposed on a substantially planar principal surface of a substrate. The structure includes a silica-based, erbium-doped active core. The active core has an erbium-to-silicon atomic ratio of at least about 0.01, an absolute erbium concentration of at least about $1.4 \times 10^{20}$ atoms per cubic centimeter, and a radiative lifetime of the erbium lasing level of at least about 7 milliseconds. Also disclosed is a method for forming an active optical device, including the step of depositing an erbium-doped active core by sputtering.

13 Claims, 2 Drawing Sheets

ERBIUM-DOPED PLANAR OPTICAL DEVICE

FIELD OF THE INVENTION

This invention relates to active optical devices, such as amplifiers, that operate by stimulated emission in laser glass, and more particularly to devices made in the form of planar optical waveguides.

ART BACKGROUND

Optical amplifiers are important in networks for distributing optical signals. Optical fiber amplifiers, made from glass that is doped with rare earth elements such as erbium, are a well-known example. For example, U.S. Pat. No. 4,826,288, issued to R. J. Mansfield, et al. on May 2, 1989, describes one method for fabricating optical fibers having cores with relatively high rare earth content. However, for applications such as premises distribution of optical signals, where components need to be relatively small and device integration is desirable, it is advantageous to provide optical amplifiers in the form of planar waveguides deposited on silicon substrates. However, as currently envisioned, such devices are much shorter than optical fiber amplifiers, and the required level of doping is correspondingly much greater.

Attempts to deposit layers of glass at the high doping level appropriate for this purpose have been generally unsatisfactory. For example, a doped soot layer can be formed by chemical vapor deposition, and subsequently sintered to form a glass layer. A method for forming glass waveguides is described, for example, in U.S. Pat. No. 4,425,146, issued to T. Izawa, et al., on Jan. 10, 1984. A process for making sintered glasses containing rare earth dopants is described, for example, in U.S. Pat. No. 4,826,288, issued to R. J. Mansfield, et al., on May 2, 1989. However, the sintering temperature required, which may be as much as about 1200° C., may promote phase separation and may damage underlying structures on the substrate. As a consequence, it would be advantageous to find a core glass composition that can be doped with erbium and incorporated in a waveguide amplifier without exposing the waveguide structure to potentially damaging, high temperatures.

SUMMARY OF THE INVENTION

In a broad sense, the invention is an active optical device in the form of a planar optical waveguiding structure. The device includes an elongate, active glass core which comprises silicon, oxygen, and erbium, the erbium being at least partially in the form of $Er^{3+}$ ions. The active core further comprises an alkali metal or alkaline earth metal in an effective quantity to prevent clustering of erbium atoms. The device further includes a glass cladding, means for coupling signal radiation into and out of the active core, and means for coupling pump radiation into the active core to pump the $Er^{3+}$ ions. The cladding and core are formed such that they overlie a substantially planar principal surface of a substrate. In the active core, the erbium-to-silicon atomic ratio is at least about 0.01, the absolute erbium concentration is at least about $1.4 \times 10^{20}$ atoms per cubic centimeter, and the erbium lasing level has a radiative lifetime of at least about 7 ms.

In another aspect, the invention is a method for forming an optical device on a silicon substrate having a substantially planar principal surface. The method includes, first, the step of forming a first layer of vitreous silicon dioxide on the principal surface. After that, a second layer of silica-based glass is deposited over the first layer by sputtering a target of silica-based glass containing sodium and erbium such that the second layer has a higher refractive index than the first layer. Significantly, the target composition is selected such that the core has an erbium-to-silicon atomic ratio of at least about 0.01 and a sodium-to-silicon atomic ratio in the approximate range 0.2-0.6, the absolute erbium concentration is at least about $1.4 \times 10^{20}$ atoms per cubic centimeter, and the target composition is further selected such that a lasing level is associated with the erbium in the core, the lasing level having a radiative lifetime of at least about 7 ms. After the sputtering step, the second layer is annealed such that it is stabilized. A portion of the second layer is subsequently removed by etching, such that an elongate core is formed. After that, a third layer of phosphosilicate glass is deposited over the core such that the third layer has a smaller refractive index than the core.

DETAILED DESCRIPTION OF A PREFERRED EMBODIMENT

The inventive optical amplifier is to be used to amplify optical signals by stimulated emission from $Er^{3+}$ ions. As is well known in the art, the appropriate signal wavelength is about 1.55 μm. Various wavelengths of pump radiation are readily used to excite the $Er^{3+}$ ions, as is described in greater detail below.

Figure 1:
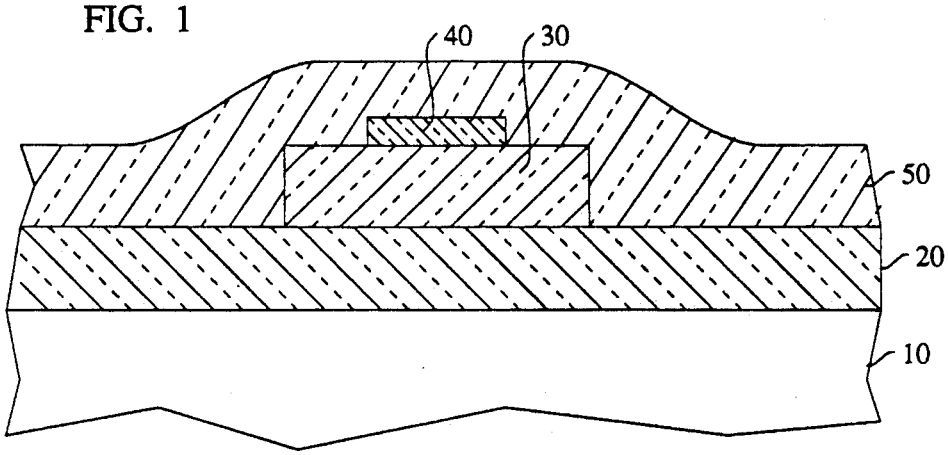
FIG. 1 is a schematic, sectional end view of the inventive waveguiding structure, according to one embodiment.

With reference to FIG. 1, a currently preferred embodiment of the inventive optical amplifier includes a silicon substrate 10, a lower cladding layer 20 overlying the substrate, a passive core 30 overlying the lower cladding layer, an active core 40 overlying the passive core, and an upper cladding layer 50 overlying the active and passive cores and the lower cladding layer. In alternative embodiments of the invention, the passive core is omitted.

As is apparent in the figure, the two cores are substantially surrounded by the two cladding layers. The refractive indices of the upper and lower cladding layers are not necessarily equal to each other. However, they should both be smaller than the refractive index of the active core, and also smaller than the refractive index of the passive core. As a consequence of the refractive index differences, electromagnetic radiation of the signal wavelength and at least one pump wavelength is guided in both the active core and the passive core. (In general, the waveguiding properties of the active and passive cores are not distinctly separable. Thus, for example, radiation guided in the active core is not guided exclusively therein, but by an effective core to which the underlying passive core also contributes.)

Preferably, the active and passive cores function as single-mode waveguides, at least with respect to the signal wavelength. Thus, signal radiation is preferably guided exclusively in the fundamental mode. However, it should be noted that alternative embodiments are envisioned in which both the active and the passive cores function as multimode waveguides with respect to both the signal and pump radiation.

The refractive index of the active core is preferably somewhat greater than the refractive index of the passive core, in order to capture the greatest possible amount of light in the active core. (For example, active and passive cores are readily made having respective refractive indices of 1.50 and 1.45.) As a consequence of such refractive index difference, electromagnetic waves that are guided in the active core will have narrower mode profiles than waves guided in the passive core. Accordingly, it is advantageous in such situations to make the active core narrower than the passive core. Such a relatively narrow active core 40 is depicted in FIG. 1.

Lower cladding layer 20 is formed on an appropriately prepared, substantially planar principal surface of substrate 10, which is exemplarily a silicon wafer. Layer 20 is exemplarily a HIPOX layer, i.e., a layer of vitreous silicon dioxide that is grown by thermal oxidation of silicon under high pressure steam according to method that are well-known in the art. The thickness of layer 20 should be greater than about 10 $\mu m$, because optical leakage may occur at substantially smaller thicknesses. A currently preferred thickness is about 15 $\mu m$.

Passive core 30 is exemplarily made from phosphosilicate glass. The phosphorus content, and concomitantly the refractive index, of the glass is selected (with reference to the compositions of layers 20 and 50 and active core 40) to provide the desired waveguiding properties, according to methods well known in the art. A useful range of glass compositions for passive core 30 consist of silica containing up to about 8 wt. % phosphorus, and the phosphorus content more typically lies in the range 4–8 wt. %. Core 30 is exemplarily deposited on layer 20 by low-pressure chemical vapor deposition, according to methods that are well-known in the art. The thickness of the passive core is exemplarily about 5 $\mu m$, and the width of the passive core is exemplarily about 7 $\mu m$.

Active core 40 is made from a silica-based glass having a relatively high concentration of erbium, e.g., glass having an erbium-to-silicon atomic ratio of at least about 0.01, preferably at least about 0.02, and still more preferably at least about 0.03. Furthermore, the absolute erbium concentration is at least about $1.4 \times 10^{20}$ atoms per cubic centimeter. A smaller erbium-to-silicon ratio is undesirable because it could lead to an undesirably small value of signal gain per unit length of the amplifier.

Various glass-modifying chemical elements (hereafter, "modifiers") are advantageously added to the glass of the active core in order to increase the solubility of erbium in the glass, and thus to prevent clustering of erbium atoms at high concentrations. Certain modifiers have been found to increase erbium solubility while avoiding concentration-quenching effects, which would otherwise reduce the $Er^{3+}$ radiative lifetime below about 7 ms at relatively high concentrations (i.e., at erbium-to-silicon atomic ratios greater than about 0.02). Modifiers that are useful in this regard include alkali metals such as sodium and alkaline earth metals such as calcium.

Modifiers are also usefully incorporated in the active core glass to control the homogeneous and inhomogeneous broadening of the $Er^{3+}$ absorption and emission peaks. Such modifiers include alkali and alkaline earth metals, which in at least some cases tend to make the peaks narrower, and elements such as lanthanum, yttrium, and zirconium, which contribute high field-strength ions and tend to broaden the peaks. Modifiers (such as aluminum and gallium) that enhance the degree of cross linkage in the glass network may also increase the degree of inhomogeneous broadening. In some cases, such modifiers are advantageously added to offset the effects of other modifiers on the absorption and emission peaks.

Modifiers are also usefully incorporated in order to stabilize the glass against devitrification, crystallization, and attack by moisture during or after film deposition. Modifiers useful for that purpose include calcium, magnesium, aluminum, and lanthanum. (Because the active core glass typically has a greater thermal expansion coefficient than the underlying silicon and silica regions, it may also be advantageous to add modifiers that reduce the thermal expansion.)

Thus, for example, an active core glass with a relatively high solubility for erbium is readily made by incorporating in silica glass an effective amount of sodium. An effective range for the sodium-to-silicon atomic ratio is from about 0.2 to about 0.6. An optional quantity of calcium, up to a calcium-to-silicon atomic ratio of about 0.2, is usefully incorporated in order to enhance erbium solubility and to stabilize the glass, as discussed above. An optional quantity of aluminum, up to an aluminum-to-silicon atomic ratio of about 0.1, is usefully incorporated in order to stabilize the glass. Similarly, optional quantities of other modifiers, such as those listed above, are usefully added in quantities that are limited, inter alia, by the ultimate refractive index desired and the relevant solubility limits.

An exemplary method for depositing active core 40 is by sputtering, as described in detail below. As noted, the refractive index of active core 40 should be greater than those of both cladding layers, and also greater than the refractive index of passive core 30. Significantly, the use of sputtering offers the advantage that the concentration of $Er^{3+}$ ions can be made substantially uniform throughout the active core. Moreover, radiation damage (which can occur when erbium doping is performed by ion implantation) is avoided.

The thickness of the active core is exemplarily about 1.2 $\mu m$. If the active core is made substantially thinner than about 1.0 $\mu m$, there will be no guided mode at the signal wavelength. The width of the active core should be at least about 4 $\mu m$, and is exemplarily about 8 $\mu m$. The total length of the active core is typically 5 mm or more.

Upper cladding layer 50 is advantageously made from phosphosilicate glass, exemplarily by low-pressure chemical vapor deposition. In order to provide the desired index of refraction, an appropriate content of, e.g., phosphorus is selected according to methods well known in the art. An exemplary phosphorus content is about 2 wt. %. The thickness of the upper cladding layer is exemplarily about 5 $\mu m$.

In use, an optical signal at a wavelength of about 1.55 $\mu m$, and pump radiation at least at one wavelength shorter than 1.55 $\mu m$, are coupled into the passive core, and from the passive core into the active core. As is well-known in the art, pump radiation is absorbed by $Er^{3+}$ ions in the active core, promoting at least some of them to the $^4I_{13/2}$ state, which is a lashing level of atomic excitation. The lasing level is not reached directly, but rather by optical excitation to any one of several excited states of still higher energy. The lasing level is reached by nonradiative decay from those higher states. Correspondingly, pump radiation is effective at any of a group of wavelengths, including 980 nm, 810 nm, 660 nm, 514 nm, and 1.48 μm.

Figure 2:
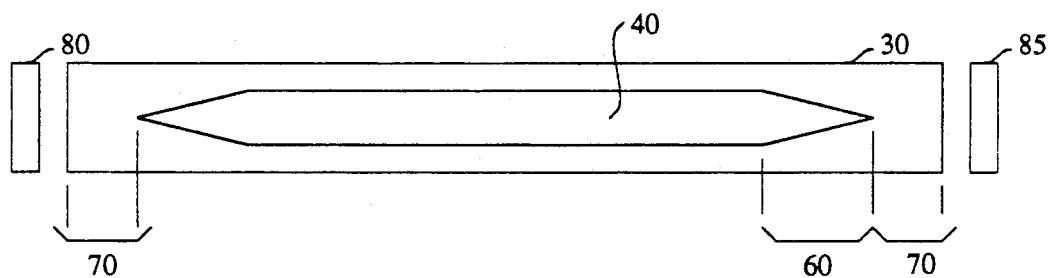
FIG. 2 is a schematic, top view of the waveguiding structure of FIG. 1.

In order for excitation of erbium ions, and resulting amplification, to take place, the signal and pump radiation must be coupled from the passive core into the active core, and vice versa. With reference to FIG. 2, this is readily achieved by providing the active core with tapers 60. That is, the active core has two terminal portions, each of which is progressively constricted as the corresponding end is approached. The constriction is in at least one dimension normal to the longitudinal axis of the core. The normal dimension may be transverse, as shown in FIG. 2, or, as depicted in FIG. 3, it may be vertical; i.e., normal to the orientation of the deposited layers.

In the preferred embodiment, the tapers 60 are adiabatic; that is, the signal radiation remains in the fundamental mode as it is coupled from the passive to the active core, and again when it is coupled from the active to the passive core. (In the preferred embodiment, the active and passive cores are, of course, single-mode waveguides with respect to the signal radiation.) As is well known in the art, a taper will be adiabatic only if it is relatively gradual. For example, a straight-sided taper in this context will generally be adiabatic if it has a reduction ratio of about 100:1; i.e., the original width (or depth) is constricted, in effect, down to zero over a length that is 100 times the original width (or depth). The length of each tapered region is exemplarily about 1 mm.

Figure 3:
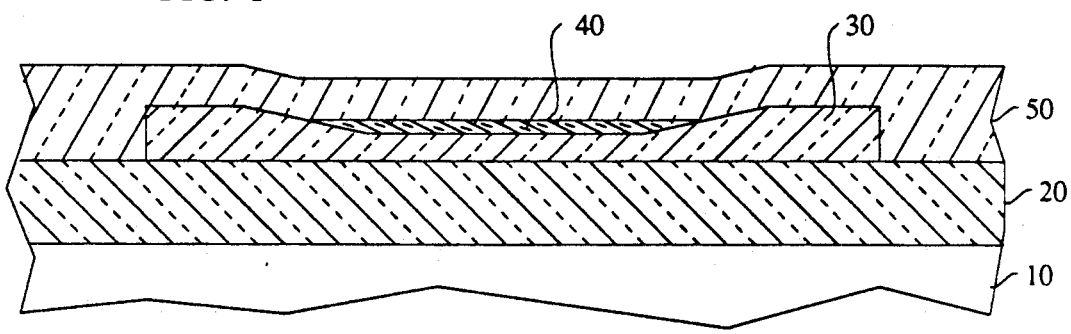
FIG. 3 is a schematic, sectional side view of the inventive waveguiding structure, according to an alternative embodiment.
Figure 4:
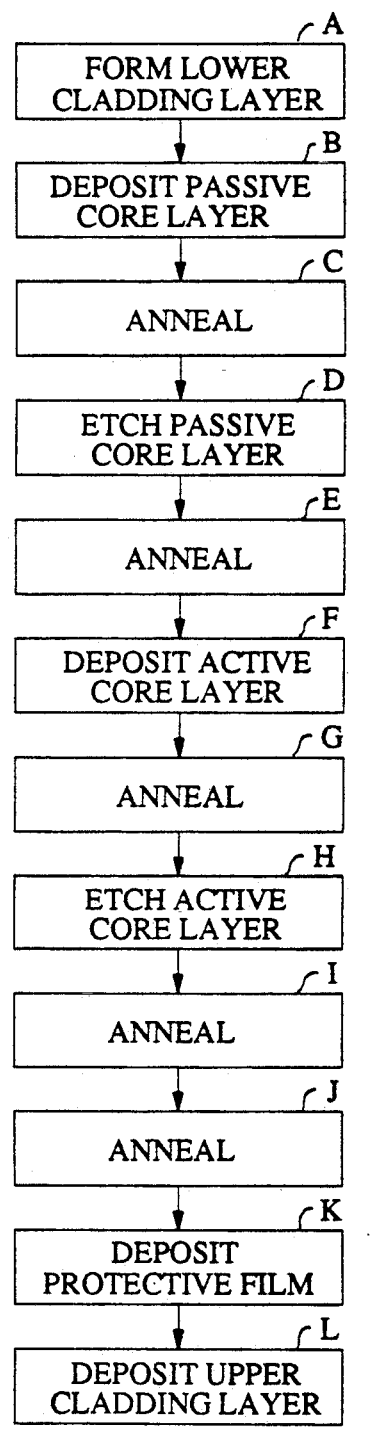
FIG. 4 is a flowchart of the steps in an exemplary process for manufacturing the inventive waveguiding structure.

Shown in FIG. 3 is a flowchart representing an exemplary sequence of steps in the fabrication of the inventive optical amplifier. The enumeration of the process steps in the following discussion is made with reference to the figure.

In Step A, the lower cladding layer is first formed.

In Step B, a layer corresponding to the passive core is then deposited on the upper surface of the lower cladding layer.

In Step C, the workpiece is annealed in order to at least partially densify the deposited passive core layer. Appropriate annealing conditions will be readily apparent to a skilled practitioner in the art.

In Step D, the passive core is then formed by etching the passive core layer. Dry etching is preferable for this step.

In Step E, the workpiece is annealed in order to flow the passive core, reducing roughness that was caused by etching. Appropriate annealing conditions will be readily apparent to a skilled practitioner in the art.

In Step F, a layer corresponding to the active core is then deposited.

In Step G, the workpiece is annealed, exemplarily at 600° C. for 2 hours in air. The purpose of this annealing step is to stabilize the deposited film (i.e., against subsequent changes in structure, optical properties, and susceptibility to chemical attack).

In Step H, the active core is then formed by etching away a portion of the active core layer. A preferred etching process for Step H is ion milling, because this process is relatively nonselective with regard to the composition of the material being removed.

In optional Step I, the workpiece is desirably annealed in order to flow the active core, and thereby to reduce surface roughness created during Step H. Appropriate annealing conditions will be readily apparent to a skilled practitioner in the art.

In Step J, the workpiece is then annealed at a temperature of at least about 700° C. for a duration of at least about 1 hour in a reactive atmosphere such as very dry oxygen. (An appropriate grade of oxygen for this purpose is research grade, i.e., 99.999% purity.) This step is believed to reduce contaminant levels.

In optional Step K, before the upper cladding layer is deposited, a protective film of an appropriate dielectric material is advantageously formed over the active core in order to prevent contamination of the active core by the upper cladding layer. Such contamination should be avoided because it can reduce the radiative lifetime of the $Er^{3+}$ ions below acceptable limits. Protective films that are effective for that purpose can be, e.g., silicon dioxide or phosphorus silicate films formed by sputtering or evaporative deposition. Such a protective film, if used, should be at least about 1000 Å thick.

In Step L, the upper cladding layer is then deposited.

Etching steps D and H are carried out such that after etching is completed, the remaining portions of the active and passive core layers describe at least one pair of elongated cores, comprising an active core overlying a passive core. The two cores have a common longitudinal axis. As is apparent in FIGS. 2 and 3, the active core is typically made smaller than the passive core in the longitudinal direction. As seen in FIG. 2, this leads to a pair of terminal passive core portions 70 not overlain by the active core. If the taper is formed with respect to the transverse direction, as shown in FIG. 2, the active core will also typically be smaller than the passive core in the transverse direction. However, if the taper is formed with respect to the vertical direction, as shown in FIG. 3, then the widths (i.e., in the transverse direction) of the active and passive cores are optionally made equal.

As noted above, an exemplary method of depositing the active core layer is by sputtering. According to this method, a glass target of a predetermined composition is provided. The silicon substrate and the target are both placed within a vacuum chamber that is evacuable to a pressure of about $3 \times 10^{-7}$ torr or less. The chamber is evacuated, and oxygen and argon are admitted. A radio-frequency discharge is produced, which leads to evaporation of material from the target and redeposition of such material on the substrate, as is well-known in the art.

As noted above, it is desirable for the deposited active core layer to contain sodium or a similarly-behaving modifier, in order to prevent clustering of the erbium atoms. Sputtering of sodium-containing glass often has unsatisfactory results because the sodium content of the deposited glass often tends to fall far below the sodium content of the target. However, we have discovered that under appropriate sputtering conditions, the sodium content of the deposited glass can be made relatively close to that of the target. We have found the following conditions in the sputtering chamber to be desirable in that regard: a pressure of 8–50 μm, and preferably about 27 μm; an argon-to-oxygen flow ratio in the range 10:1 to 0.3:1, and preferably about 0.5:1; a substrate temperature that can range freely between about 25° C. and about 70° C.; and rf frequency of 13.6 MHz and power of about 50 W. We used a target 3 in. (7.6 cm) in diameter and a silicon-wafer substrate 4 in. (10.2 cm) in diameter. The target was situated 1-3 in. (2.5-7.6 cm) from the substrate, preferably about 3 in. (7.6 cm).

The radiative lifetime of the lasing level of the excited erbium ions is desirably at least about 7 ms. In order to achieve such relatively high lifetimes, it is particularly important to include, during formation of the device, Step J, annealing in a reactive atmosphere.

In use, the signal and the pump radiation are combined and injected into the amplifier, exemplarily by means of directional coupler or wavelength division multiplexer 80, shown in FIG. 2. The amplified signal is extracted, exemplarily by wavelength division de-multiplexer 85 of FIG. 2, and unwanted pump radiation that would otherwise contaminate the amplified signal is eliminated, exemplarily by filtering. Such methods are well-known in the art, and need not be described here in detail.

The foregoing discussion is for illustrative purposes only, and is not intended to limit the scope of the invention to a single-pass optical amplifier. For example, a laser or parametric oscillator is readily made by incorporating at least one optical feedback element with the inventive waveguiding structure. An appropriate such element is, e.g., a mirror or a distributed Bragg reflector. Such an arrangement is readily envisioned with reference to FIG. 2, substituting a mirror or Bragg reflector for one or both of elements 80 and 85.

EXAMPLE

Erbium-doped glass films, varying in thickness from about 0.8 μm at the edge to about 1.5 μm at the center, were formed on 4-in. (10.2-cm) diameter silicon wafer substrates by sputter deposition, substantially as described above. In separate trials, three different target compositions were used. The target compositions will be described with reference to the general formula $SiO_2(Na_2O)_a(CaO)_b(Er_2O_3)_c$. The compositions of the resulting, sputter-deposited films will similarly be represented by $SiO_2(Na_2O)_{a'}(CaO)_{b'}(Er_2O_3)_{c'}$.

The first target had a=0.27, b=0.14, and c=0.028. The resulting sputterdeposited layer had a'=0.20, b'=0.117, and c'=0.0275. The second target had a=0.34, b=0.00, and c=0.033, resulting in a deposited layer with a'=0.30 and c'=0.036. The third target had a=0.265, b=0.00, and c=0.038, resulting in a deposited layer with a'=0.17 and c'=0.032. The deposited layers were analyzed by Rutherford backscattering. All three layers had erbium radiative lifetimes of about 10 milliseconds, and densities of about $6 \times 10^{22}$ atoms per cubic centimeter.

We claim:

1. An optical device, comprising:
   a) an elongate, active glass core which extends along a longitudinal axis and comprises silicon, oxygen, and erbium, the erbium being at least partially in the form of $Er^{3+}$ ions, the active core having a refractive index;
   b) a glass cladding comprising at least one layer which at least partially surrounds the active core and has a refractive index which is smaller than the core refractive index;
   c) means for coupling signal radiation, having a signal wavelength, into the active core and means for coupling the signal radiation out of the active core; and
   d) means for coupling pump radiation into the active core such that pump radiation of an appropriate wavelength will excite at least some of the $Er^{3+}$ ions to a lasing level, leading to amplification of the signal radiation by stimulated emission,

CHARACTERIZED IN THAT e) the device further comprises a substrate having a substantially planar principal surface;
   f) the active core is a body that overlies a portion of the principal surface;
   g) the cladding comprises a lower cladding layer disposed between the active core and the principal surface, and an upper cladding layer which overlies and partially surrounds the active core;
   h) the active core further comprises an alkali metal or alkaline earth metal in an effective quantity to prevent clustering of erbium atoms;
   i) the active core has an erbium-to-silicon atomic ratio of at least about 0.01 and an absolute erbium concentration of at least about $1.4 \times 10^{20}$ atoms per cubic centimeter; and
   j) the lasing level has a radiative lifetime of at least about 7 ms.

2. The optical device of claim 1, wherein the substrate comprises a silicon body.

3. The optical device of claim 1, wherein the active core has an erbium-to-silicon atomic ratio of at least about 0.02.

4. The optical device of claim 1, wherein the active glass core is adapted to guide the fundamental mode of the signal wavelength, and the means for coupling the signal radiation into and out of the active core are adapted to couple the signal radiation adiabatically.

5. The optical device of claim 1, wherein the concentration of $Er^{3+}$ ions is substantially constant throughout the active core, and the active core is substantially free of radiation damage.

6. The optical device of claim 1, wherein the alkali metal or alkaline earth metal comprises sodium, and the active core has a sodium-to-silicon atomic ratio in the approximate range 0.2-0.6.

7. The optical device of claim 1, wherein the alkali metal or alkaline earth metal comprises calcium, and the active core has a calcium-to-silicon atomic ratio of not more than about 0.2.

8. The optical device of claim 4, further comprising an elongate, waveguiding, passive, glass core which extends along the longitudinal axis and is disposed between the lower cladding layer and the active core, the passive core being adapted to guide the fundamental mode of the signal radiation, means for coupling an optical signal and pump radiation into the passive core, and means for coupling signal radiation out of the passive core, wherein:

the passive core is substantially free of erbium and has a refractive index that is smaller than the active core refractive index but larger than the upper and lower cladding refractive indices, the active core includes a central portion and two ends, and the means for coupling the signal radiation into and out of the active core comprise two further, tapered portions of the active core, each tapered portion extending between the central portion and an end and tapering toward the respective end such that the tapered portion is progressively constricted in at least one direction perpendicular to the longitudinal axis.

9. The optical device of claim 8, wherein the perpendicular direction is substantially parallel to the substrate principal surface.

10. The optical device of claim 8, wherein the perpendicular direction is substantially normal to the substrate principal surface.

11. The optical device of claim 8, wherein the passive core comprises phosphosilicate glass, the upper cladding layer comprises phosphosilicate glass, and the lower cladding layer comprises thermal silicon dioxide.

12. The optical device of claim 1, further comprising at least one optical feedback element, such that the device can function as a laser.

13. The optical device of claim 1, further comprising at least one optical feedback element, such that the device can function as a parametric oscillator.

* * * * *